(12) United States Patent
Kim et al.

(10) Patent No.: US 7,203,529 B2
(45) Date of Patent: Apr. 10, 2007

(54) BAR TYPE PORTABLE WIRELESS TERMINAL

(75) Inventors: Sung-Kwon Kim, Seoul (KR); Chang-Soo Lee, Inchonkwangyok-shi (KR); Seung-Min Park, Seoul (KR); Jun-Sang Park, Anyang-shi (KR); Jun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 326 days.

(21) Appl. No.: 10/795,375

(22) Filed: Mar. 8, 2004

(65) Prior Publication Data

US 2004/0180703 A1    Sep. 16, 2004

(30) Foreign Application Priority Data

Mar. 10, 2003  (KR)  .................... 10-2003-0014842

(51) Int. Cl.
*H04M 1/00*  (2006.01)
*H04M 9/00*  (2006.01)

(52) U.S. Cl. ................. 455/575.1; 455/575.4; 455/575.3; 455/575.8; 379/433.11; 379/433.12

(58) Field of Classification Search ............ 455/575.4, 455/575.8, 575.1; 379/433.12, 433.13, 428.04, 379/433.11; 361/679
See application file for complete search history.

(56) References Cited

U.S. PATENT DOCUMENTS 6,009,338 A * 12/1999 Iwata et al. ............... 455/575.4
6,141,505 A * 10/2000 Miyata et al. ............... 396/535
6,278,884 B1 * 8/2001 Kim II ...................... 455/556.1
6,287,021 B1 * 9/2001 Katoh et al. ................ 396/348
6,614,481 B1 * 9/2003 Sasaki ......................... 348/373
6,795,715 B1 * 9/2004 Kubo et al. ............... 455/556.1
2001/0004269 A1 * 6/2001 Shibata et al. ......... 348/333.06
2002/0015102 A1 * 2/2002 Itoh et al. .............. 348/333.06
2002/0018134 A1 * 2/2002 Tsukahara et al. ..... 348/333.01
2004/0179330 A1 * 9/2004 Lee et al. .................... 361/679

FOREIGN PATENT DOCUMENTS

WO    WO 2005013585 A1 *  2/2005

* cited by examiner

*Primary Examiner*—William Trost
*Assistant Examiner*—Marivelisse Santiago-Cordero
(74) *Attorney, Agent, or Firm*—The Farrell Law Firm

(57) ABSTRACT

A bar type portable wireless terminal includes a lower body installed at its one side surface with a camera lens unit, and at the other surface an image reproduction device is adapted to output images captured by the camera lens unit, and an upper body coupled to an upper end of the lower body so that it is rotatable in a twisting direction relative to a rotation axis extending in a longitudinal direction of the lower body, the upper body being installed at its front surface with a display device adapted to enable the output of the images captured by the camera lens unit. The portable wireless terminal can be used as a digital image device and functions as portable phone, PDA and so on.

9 Claims, 6 Drawing Sheets

BAR TYPE PORTABLE WIRELESS TERMINAL

PRIORITY

This application claims priority to an application entitled "BAR TYPE PORTABLE WIRELESS TERMINAL", filed in the Korean Industrial Property Office on Mar. 10, 2003 and assigned Ser. No. 2003-14842, the contents of which are hereby incorporated by reference.

BACKGROUND OF THE INVENTION

1. Field of the Invention

The present invention relates to a portable wireless terminal, and more particularly to a bar type portable wireless terminal, which involves the complex functions of PDA, portable phone, digital imaging device and so on.

2. Description of the Related Art

Generally, portable wireless terminals are classified into bar type terminals, flip type terminals and folder type terminals, in accordance with an external form thereof.

The bar type terminals are configured so that a single body housing thereof is provided with a keypad as data input means, a display device as data output means, and receiver and transmitter modules. Such a bar type terminal has an advantage that its entire construction is simple.

The flip type terminals generally comprise a terminal body, a flip cover, and a hinge mechanism adapted to rotatably couple the flip cover to the terminal body. Although the terminal body of the flip type terminal is configured in the same manner as that of the bar type terminal, the flip cover is adapted to cover a keypad provided on the terminal body when the terminal is in a call waiting mode. Thus, the flip type terminal has an advantage that it can prevent the malfunctioning of the keypad.

The folder type terminals generally comprise a terminal body, a folder, and a hinge mechanism adapted to rotatably couple the folder to the terminal body. The folder is adapted to be opened away from or closed to the terminal body according to its rotation relative to the terminal body. In a call waiting mode wherein the folder is folded to come into close contact with the terminal body, the folder is adapted to cover a keypad provided on the terminal body, thereby preventing the malfunctioning of the keypad. Further, in a conversation mode wherein the folder is unfolded to a certain opened position, the portable wireless terminal is adapted to ensure a sufficient distance between transmitter and receiver modules, thereby advantageously achieving miniaturization thereof.

Meanwhile, as mobile services become increasingly diversified, their utilization range expands to various uses including motion picture providing services, video communications, and financial services, as well as conventional short message services and voice communications.

According to this trend, various add-ons such as a camera lens and so on are installed to conventional portable wireless terminals, but there is a problem that the conventional portable wireless terminals can't sufficiently satisfy diverse mobile communication services and options. In addition, as the use of the portable wireless terminals becomes universalized, customers require a wider range of the portable wireless terminals, in accordance with a variety of standards including designs and functions thereof. However, the conventional terminals can't sufficiently reflect such diverse customers' requirements via a single terminal.

SUMMARY OF THE INVENTION

Therefore, the present invention has been made in view of the above problems, and it is an object of the present invention to provide a portable wireless terminal, which can provide a broad range of rapidly developing mobile communication services.

It is another object of the present invention to provide a portable wireless terminal, which has an advantage of being configured to accommodate an expanding range of the portable wireless service options in accordance with customers' increasingly diversified requirements.

It is yet another object of the present invention to provide a portable wireless terminal, which is structured simply so as to allow a user to easily access such wide range of mobile communication services, options and content while providing reliable operation.

In accordance with one aspect of the present invention, the above and other objects can be accomplished by the provision of a bar type portable wireless terminal comprising: a lower body installed at a first side surface with a camera lens unit, and a second side surface with an image reproduction device adapted to output images captured by the camera lens unit; and an upper body coupled to an upper end of the lower body so that it is rotatable in a twisting direction relative to a rotation axis extending in a longitudinal direction of the lower body, the upper body being installed at its front surface with a display device adapted to enable the output of the images captured by the camera lens unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
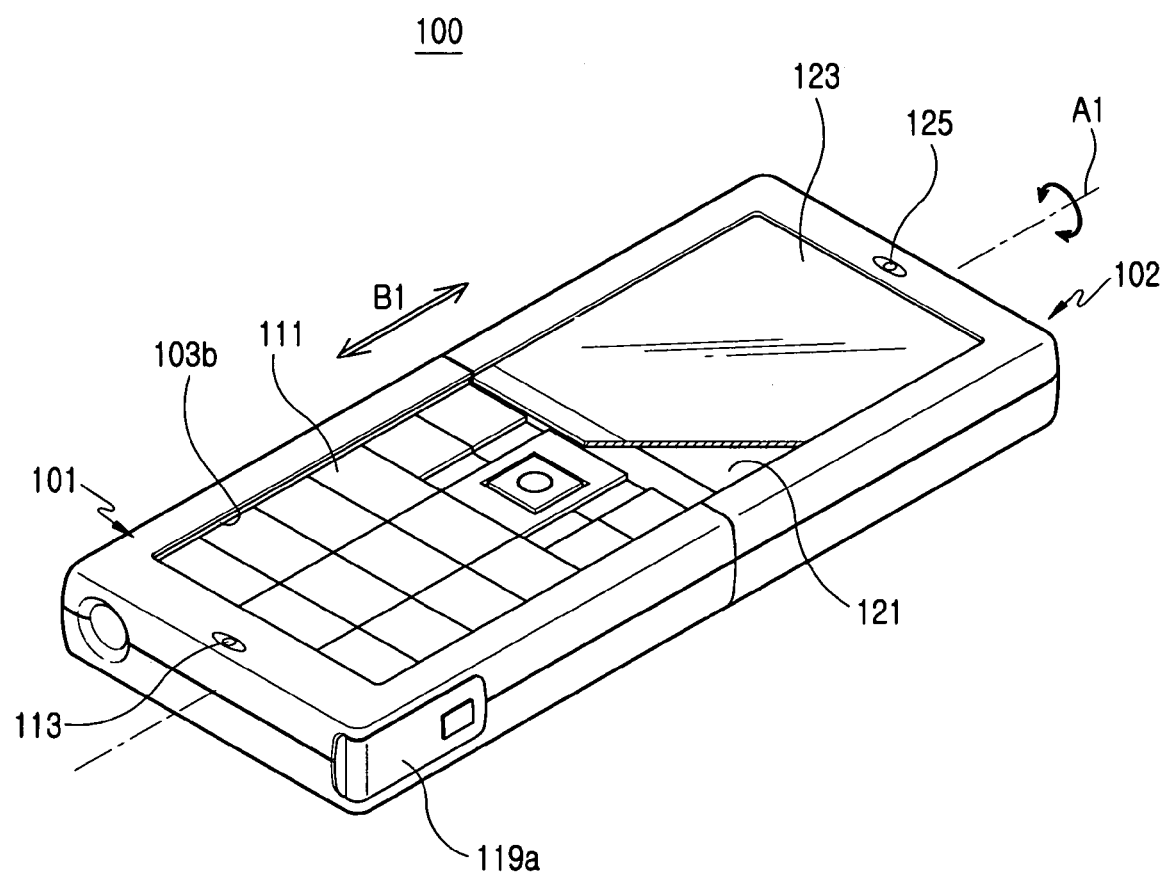
FIG. 1 is a perspective view illustrating a bar type portable wireless terminal in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted to avoid obscuring the subject matter of the present invention with unnecessary detail. Also, the terms used in the following description are terms defined taking into consideration the functions obtained in accordance with the present invention. The definitions of these terms should be determined based on the whole content of this specification because it may be changed in accordance with the option of a user or within usual practice.

Figure 2:
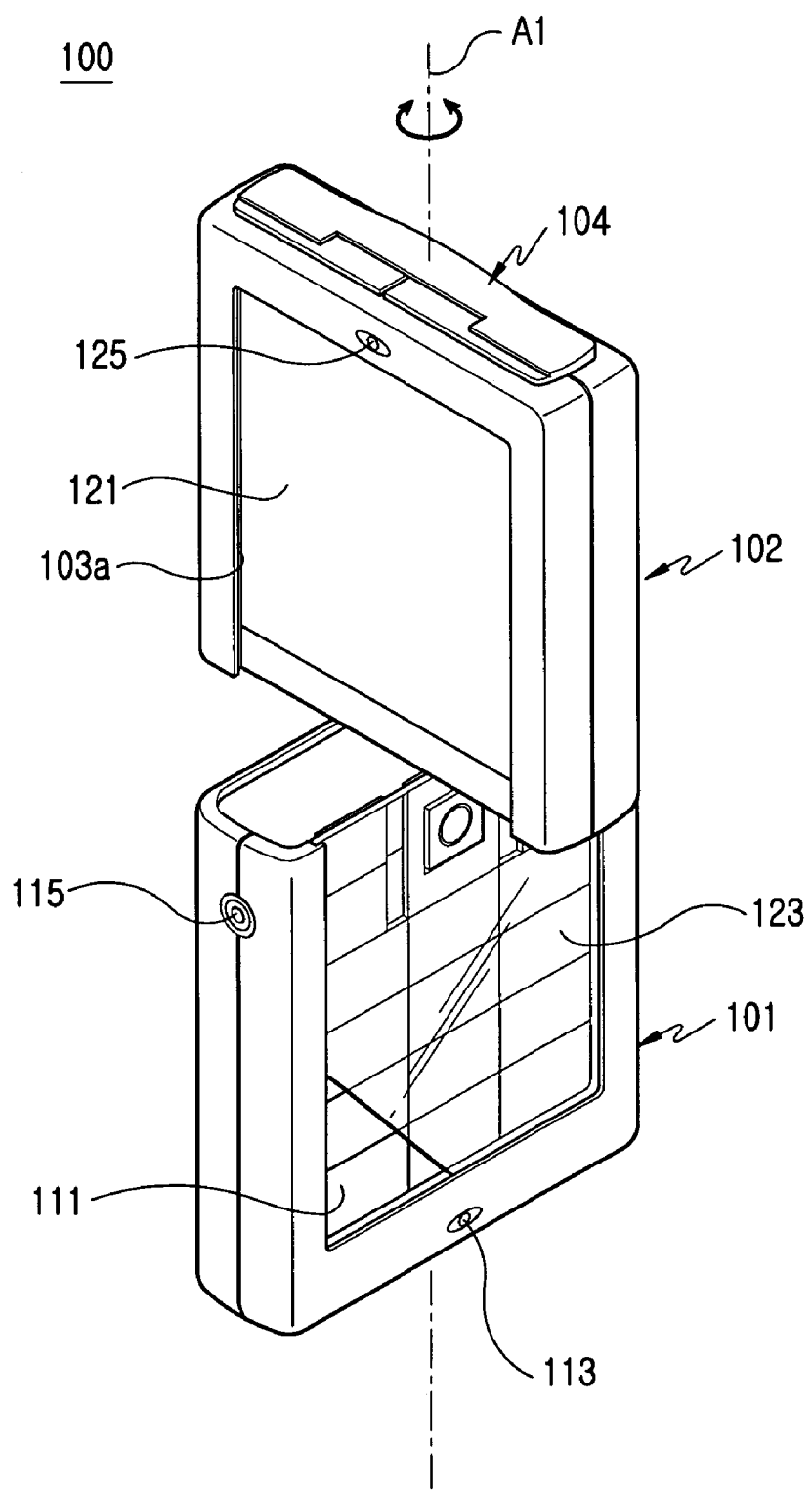
FIG. 2 is a perspective view illustrating a state wherein an upper body of the terminal shown in FIG. 1 is rotated.
Figure 3:
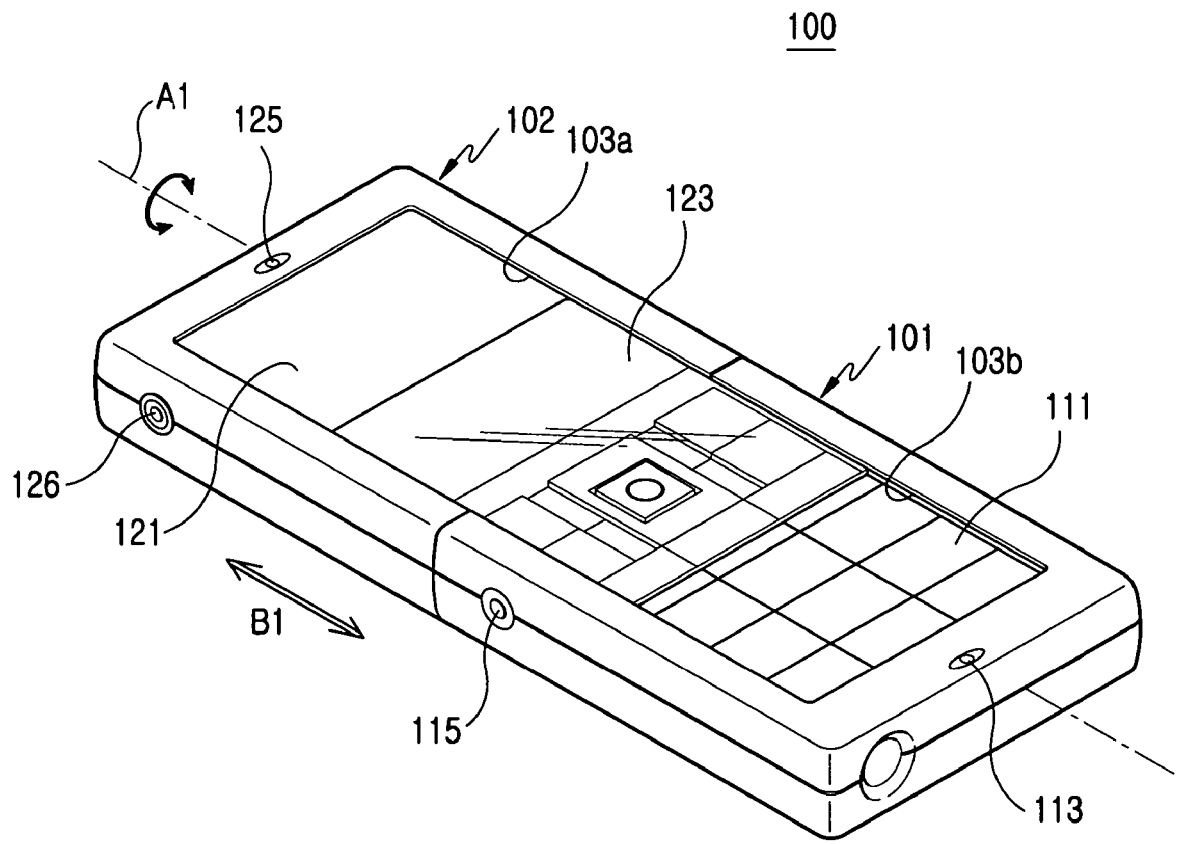
FIG. 3 is a perspective view illustrating sliding movements of a slidable cover provided in the terminal shown in FIG. 1.

FIG. 1 is a perspective view illustrating a bar type portable wireless terminal, designated as a reference numeral 100, in accordance with a preferred embodiment of the present invention. FIG. 2 is a perspective view illustrating a state wherein an upper body, designated as a reference numeral 102, of the terminal 100 shown in FIG. 1 is rotated. FIG. 3 is a perspective view illustrating sliding movements of a slidable cover, designated as a reference numeral 123, provided in the terminal 100 shown in FIG. 1. As shown in FIGS. 1 to 3, the portable wireless terminal 100 according to the preferred embodiment of the present invention is a bar type terminal comprising a lower body 101 and upper body 102. The upper body 102 is rotatably coupled to an upper end of the lower body 101.

The lower body 101 is provided at its front surface with a keypad 111 and transmitter 113, containing a microphone, below the keypad 111. The lower body 101 is also provided at a first side surface with a camera lens unit 115 and a second side surface with an image reproduction device 117. The camera lens unit 115, shown in FIG. 2, is installed inside the lower body 101 in such a fashion that its exposure window faces a sideward direction of the lower body 101. The image reproduction device 117, shown in FIG. 4, serves to reproduce images captured by the camera lens unit 115.

Figure 6:
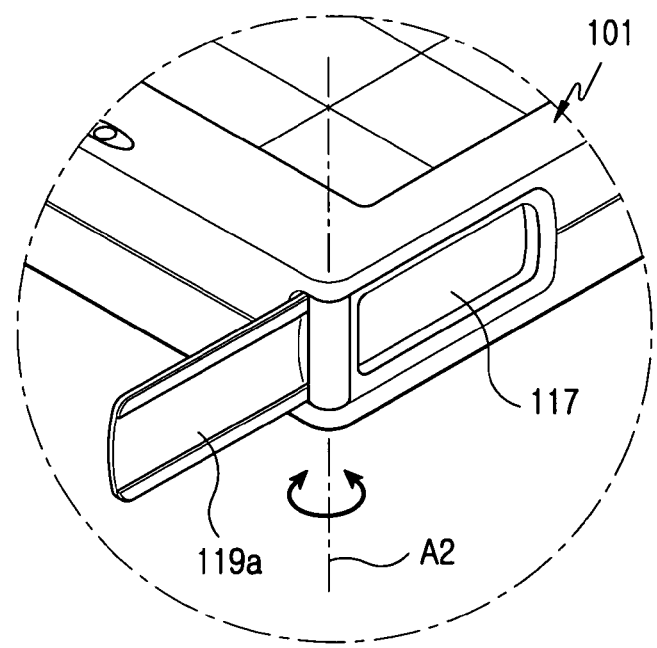
FIG. 6 is a perspective view illustrating a protective cover of an image reproduction device of the terminal shown in FIG. 1.
Figure 7:
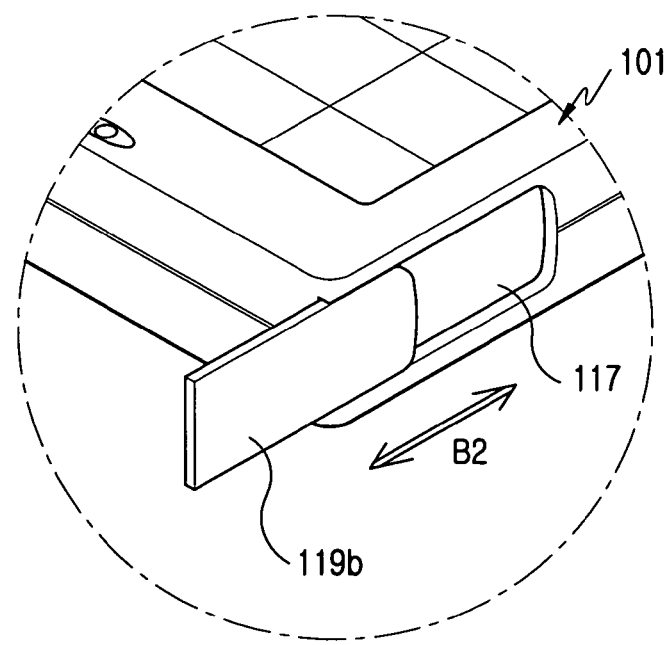
FIG. 7 is a perspective view illustrating another type protective cover of the image reproduction device of the terminal shown in FIG. 1.

Referring to FIGS. 6 and 7, the image reproduction device 117 is adapted to be protected by a protective cover 119a or 119b, except during image reproduction. FIG. 6 illustrates a rotary type protective cover 119a, which is rotatably coupled to one side end of the image reproduction device 117 relative to a rotation axis A2. FIG. 7 illustrates a sliding type protective cover 119b, which is adapted to slidably reciprocate in a direction of arrow B2.

Referring to FIGS. 1 to 3, the upper body 102 is rotatably coupled to the upper end of the lower body 101 such that the upper body 102 is rotatable in a twisting direction relative to the rotation axis A1 extending in a longitudinal direction of the lower body 101. The upper body 102 is provided at its front surface with a display device 121, and a receiver 125, containing a speakerphone, above the display device 121. The display device 121 is preferably embodied as a touch screen, and adapted to display images captured by the camera lens unit 115.

Figure 5:
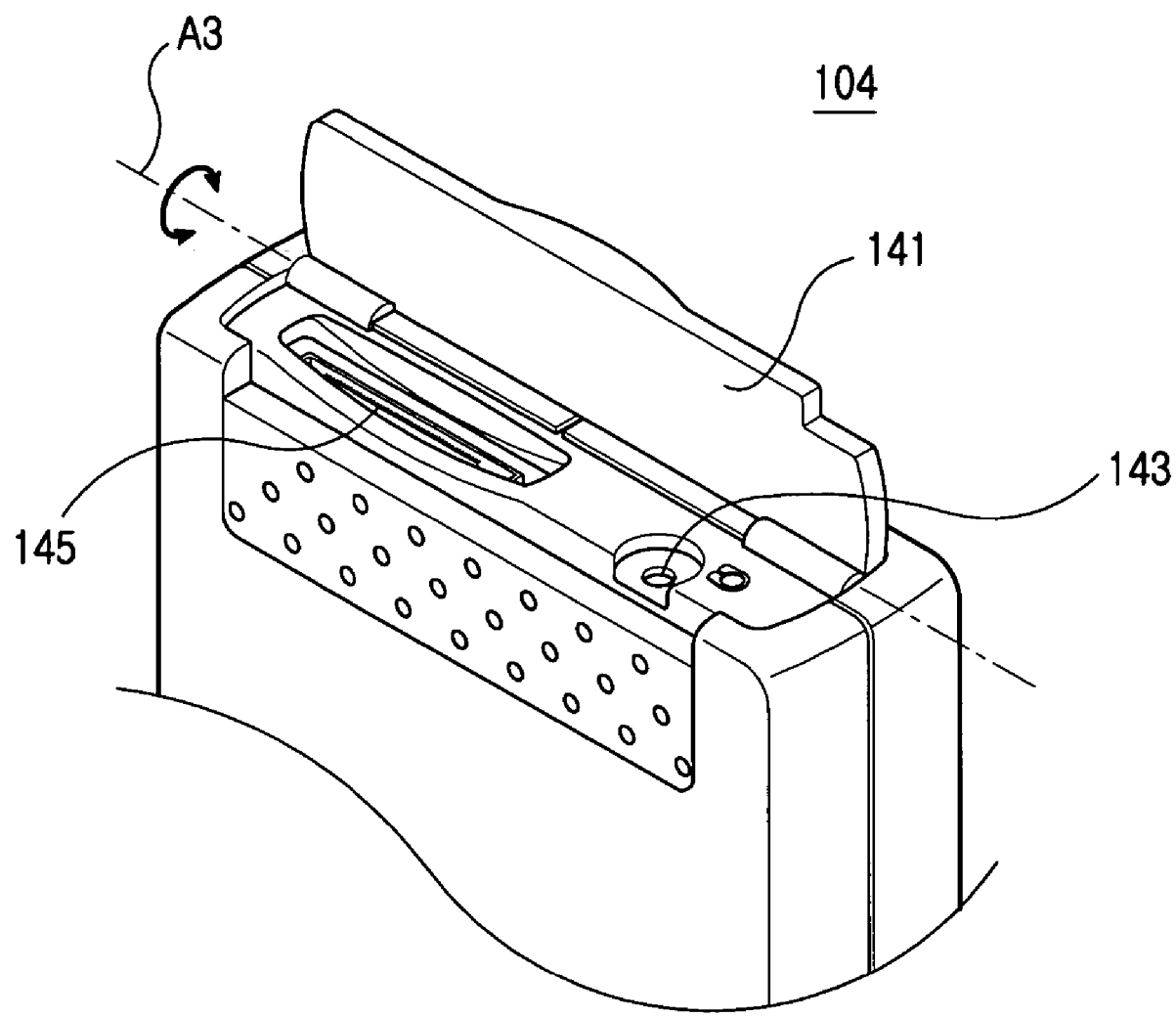
FIG. 5 is a perspective view illustrating a MMC (Man Machine Communication) slot of the terminal shown in FIG. 1.

The upper body 102 is also provided at its upper end surface with a MMC (man machine communication) slot 104. Referring to FIG. 5 illustrating the MMC slot 104 in detail, the MMC slot 104 is provided therein with an ear-microphone jack 143 and a multi-connector 145. The multi-connector 145 enables the portable wireless terminal 100 to be connected to a personal computer, external storage device, and so on. The MMC slot 104 is adapted to be protected by a slot cover 141 rotatably coupled thereto relative to a rotation axis A3 extending in a transverse direction of the terminal 100. The slot cover 141 serves to prevent impurities from entering the ear-microphone jack 143 or multi-connector 145. Although not shown, the slot cover 141 may be constructed as a sliding type cover.

Lower and upper bodies 101 and 102 of the terminal 100 are formed with first and second sliding guides 103a and 103b, respectively. The first sliding guides 103a extend along both longitudinal edges of the display device 121, and the second sliding guides 103b extend along both longitudinal edges of the keypad 111. Where the keypad 111 and display device 121 face the same direction, i.e. when the lower and upper bodies 101 and 102 are not rotated, the first sliding guides 103a are aligned with the second sliding guides 103b.

The terminal 100 is provided at its front surface with a slidable cover 123, which is adapted to move slidably along the first and second sliding guides 103a and 103b. Namely, the slidable cover 123 is movable in a direction of arrow B1, shown in FIGS. 1 and 3, along the first and second sliding guides 103a and 103b. Preferably, in order to protect the display device 121 while allowing a user to look at information displayed on the display device 121, the slidable cover 123 is made of transparent materials such as glass and acrylic. FIG. 1 illustrates a state wherein the slidable cover 123 is positioned on the display device 121, and FIG. 2 illustrates a state wherein the slidable cover 123 is positioned on the keypad 111. Although not shown in FIGS. 1 and 2, it should be clearly understood that the slidable cover 123 has to be fixed when it is positioned on the keypad 111.

When the slidable cover 123 is positioned on the upper body 102, a part of the slidable cover 123, namely, its one end portion, is also positioned on the keypad 111 of the lower body, thereby causing the slidable cover 123 to constrain the rotation of the upper body 102. This is possible since a length of the first sliding guides 103a provided at the upper body 102 is shorter than that of the second sliding guides 103b provided at the lower body 101 and the slidable cover 123 has the same length as the second sliding guides 103b provided at the lower body 101. Similarly, it should be clearly understood that the rotation of the upper body 102 is also constrained where the length of the first sliding guides 103a is longer than that of the second sliding guides 130b and the slidable cover 123 has the same length as the first sliding guides 103a.

In addition, if the slidable cover 123 has a length shorter than the lengths of the respective first and second sliding guides 103a and 103b, the upper body 102 is adapted to freely rotate regardless of a position of the slidable cover 123. In this way, the slidable cover 123 also functions to selectively limit the manipulation of the terminal 100, in addition to its protective function. That it to say, when the slidable cover 123 is positioned on the upper body 102, a user is allowed to manipulate the terminal 100 or input data only through the keypad 111. When the slidable cover 123 is positioned on the lower body 101, the touch screen is operable as a PDA terminal mode enabling data input using a pen. Therefore, where the terminal 100 is manipulated for an image capturing purpose or a data input purpose using the touch screen and pen in a state wherein the slidable cover 123 is positioned on the lower body 101, it is possible to prevent the malfunctioning of the keypad 111. As stated above, the slidable cover 123 functions as an operation conversion switch.

Figure 4:
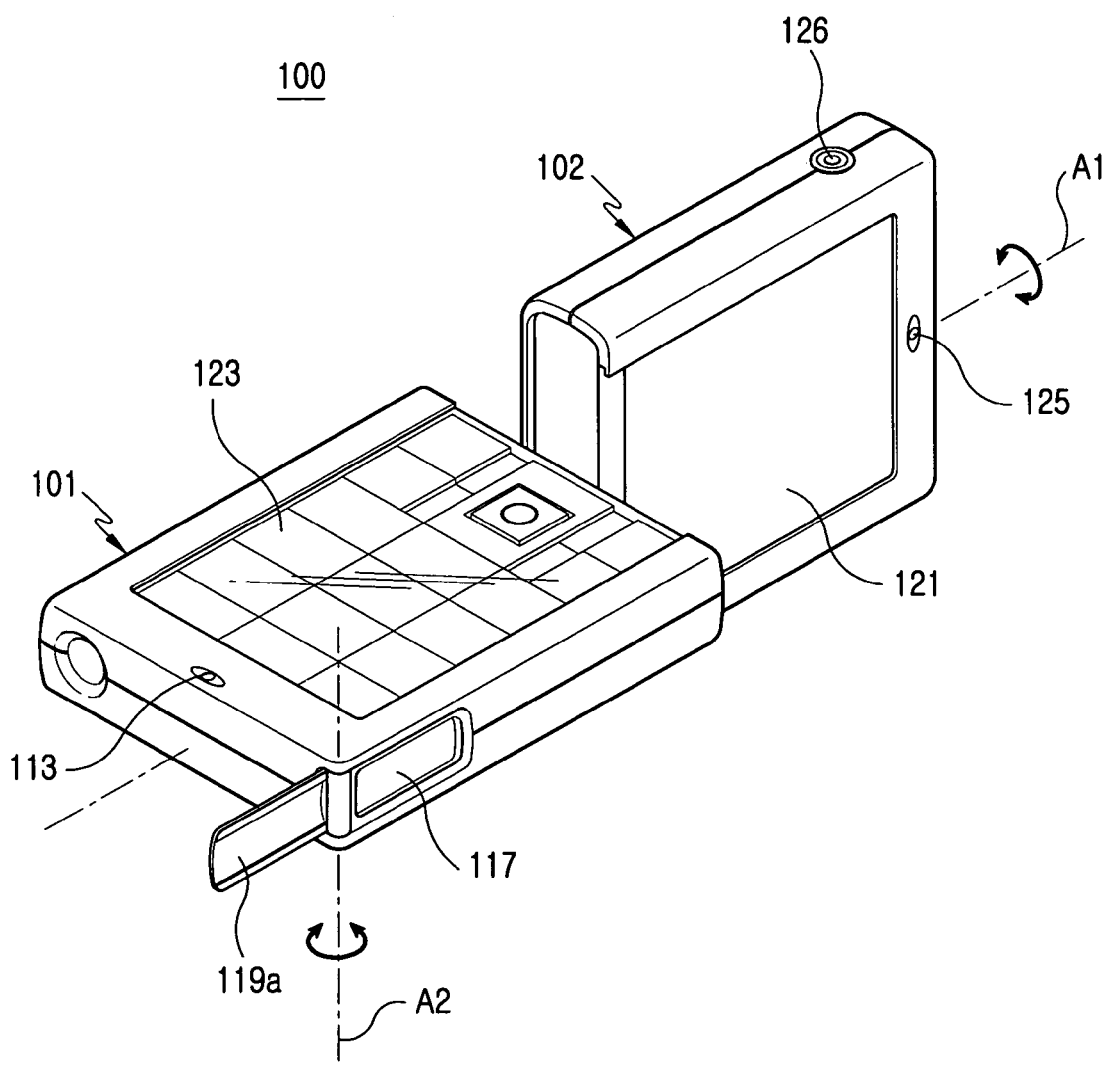
FIG. 4 is a perspective view illustrating a state wherein the terminal shown in FIG. 1 is used as a digital imaging device.

FIG. 4 is a perspective view illustrating a state wherein the terminal 100 shown in FIG. 1 is used as a digital imaging device. The upper body 102 of the terminal 100 is shown in FIG. 4 with the lower body 101 rotated at 90° about the rotation axis A1, and the slidable cover 123 is positioned on the keypad 111. In this state, the camera lens unit 115 is used to capture images and the captured images can be displayed selectively on the image reproduction device 117 or display device 121. Thus, it should be clearly understood that the portable wireless terminal 100 can be utilized as a digital camera as well as the digital imaging device. For image capturing using the camera lens unit 115, the upper body 102 is provided at its one side surface with a shutter button 126 (shown in FIG. 3). The shutter button 126 may be substituted with one selected from among key buttons on the keypad 111 of the lower body 101, in accordance with the arrangement of the sliding cover 123 and sliding guides, 103a and 103b.

Meanwhile, the terminal 100 is configured to enable a user to edit the images captured by the camera lens unit 115 in real time while confirming them through the image reproduction device 117. This is possible since the display device 121 is preferably constructed as a touch screen which can be set to display an image edition menu when the terminal 100 is operated as the digital imaging device. In addition, the terminal 100 is adapted to be connected to certain external devices through the multi-connector 145 installed at the upper body 102, thereby ensuring a sufficient storage capacity required to store the captured images. Furthermore, if an image capturing direction of the camera lens unit 115 and an image display direction of the display device 121 are appropriately set, e.g. set in the same plane, a user can conveniently perform video communications using the terminal 100.

As apparent from the above description, a portable wireless terminal of the present invention can be used as a digital image device according to requirements of a user, as well as functioning as a portable phone, PDA and so on. Namely, the portable wireless terminal in accordance with the present invention has an advantage that it can function as a multimedia device as well as a mobile communication terminal. Where the portable wireless terminal is used as the multimedia device, the user can conveniently use it without a limitation of storage capacity since it is configured to be easily connected to certain external devices using a multi-connector provided therein. Furthermore, the portable wireless terminal is configured to allow the user to directly edit the captured images using a display device constructed as a touch screen while confirming the images using an image reproduction device thereof. This improves a convenience of use as the multimedia device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bar type portable wireless terminal comprising:
    a lower body having installed at a first side surface a camera lens unit, and installed at a second side surface an image reproduction device adapted to output images captured by the camera lens unit;
    an upper body coupled to an upper end of the lower body, rotatable relative to a rotation axis extending in a longitudinal direction of the lower body, the upper body having installed on a front surface a display device adapted to enable the output of the images captured by the camera lens unit;
    first sliding guides longitudinally formed along both side edges of the display device;
    second sliding guides longitudinally formed at both sides of a front surface of the lower body, the first sliding guides being aligned with the second sliding guides when the display device and the front surface of the lower body are positioned in the same plane; and
    a slidable cover moving alone the first and second sliding guides to open and close the display device when the first sliding guides are aligned with the second sliding guides,
    wherein, when the slidable cover closes the display device, the slidable cover is positioned on the entire length of the first sliding guides as well as on one end of the second sliding guides, thereby constraining rotation of the upper body about the rotation axis.

2. The bar type portable wireless terminal as set forth in claim 1, wherein the lower body further comprises a protective cover rotatably hinged to the second side surface of the lower body in order to open and close the image reproduction device.

3. The bar type portable wireless terminal as set forth in claim 1, wherein the lower body further comprises a protective cover slidably coupled to the second side surface of the lower body for sliding over the image reproduction device in order to open and close the image reproduction device.

4. The bar type portable wireless terminal as set forth in claim 1, further comprising a keypad located between the second sliding guides provided at the both sides of the lower body.

5. The bar type portable wireless terminal as set forth in claim 1, wherein the slidable cover is made of a transparent material.

6. The bar type portable wireless terminal as set forth in claim 1, wherein, in a state wherein the slidable cover is positioned on the second sliding guides, the upper body is rotatable relative to the rotation axis.

7. The bar type portable wireless terminal as set forth in claim 1, wherein the upper body is provided at an upper end with a Man Machine Communication (MMC) slot, in which a multi-connector and an ear-microphone jack are installed.

8. The bar type portable wireless terminal as set forth in claim 1, wherein the upper body is provided at an upper end of the front surface with a receiver containing a speakerphone, and the lower body is provided at a lower end of a front surface thereof with a transmitter containing a microphone.

9. The bar type portable wireless terminal as set forth in claim 1, wherein the display device is constructed as a touch screen.

* * * * *